(12) United States Patent
Bono et al.

(10) Patent No.: US 9,804,939 B1
(45) Date of Patent: Oct. 31, 2017

(54) SPARSE RAID REBUILD BASED ON STORAGE EXTENT ALLOCATION

(71) Applicant: EMC Corporation, Hopkinton, MA (US)

(72) Inventors: Jean-Pierre Bono, Westborough, MA (US); Philippe Armangau, Acton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 90 days.

(21) Appl. No.: 14/870,190

(22) Filed: Sep. 30, 2015

(51) Int. Cl.
*G06F 11/00* (2006.01)
*G06F 11/20* (2006.01)
*G06F 3/06* (2006.01)

(52) U.S. Cl.
CPC ........ *G06F 11/2094* (2013.01); *G06F 3/0619* (2013.01); *G06F 3/0644* (2013.01); *G06F 3/0689* (2013.01)

(58) Field of Classification Search
CPC .................................................. G06F 11/2094
USPC ............................ 714/6.32, 6.31, 6.3, 10–13
See application file for complete search history.

(56) References Cited

U.S. PATENT DOCUMENTS

| | | | |
|---|---|---|---|
| 7,809,884 B1 | 10/2010 | Linnell | |
| 9,354,975 B2 | 5/2016 | Aliev et al. | |
| 9,400,792 B1 | 7/2016 | Bono et al. | |
| 9,507,535 B2 | 11/2016 | Aliev et al. | |
| 2007/0088990 A1* | 4/2007 | Schmitz | G11B 20/20 714/700 |
| 2014/0325262 A1* | 10/2014 | Cooper | G06F 11/1092 714/6.22 |
| 2016/0239397 A1* | 8/2016 | Thomas | G06F 11/2094 |

OTHER PUBLICATIONS

Edward S. Robins, et al.; "Spare Selection in a Declustered Raid System", U.S. Appl. No. 14/729,714, filed Jun. 3, 2015.

* cited by examiner

*Primary Examiner* — Dieu-Minh Le
(74) *Attorney, Agent, or Firm* — BainwoodHuang (57) ABSTRACT

A technique for repairing a RAID (Redundant Array of Independent Disks) group in a data storage system following a failure of a disk drive in the RAID group includes identifying regions of the failed disk drive that supported unallocated storage extents and writing predetermined data to corresponding regions of the spare disk drive. Any reading of other disk drives in the RAID group may thus be limited only to those regions of the failed disk drive that supported allocated storage extents.

21 Claims, 8 Drawing Sheets

Slice Allocation Metadata 156

| Slice # | Alloc. Status |
|---|---|
| 0 | 1 |
| 1 | 0 |
| 2 | 1 |
| 3 | 0 |
| 4 | 0 |
| 5 | 1 |
| 6 | 1 |
| 7 | 0 |
| 8 | 1 |
| 9 | 0 |
| 10 | 0 |
| 11 | 0 |
| 12 | 0 |

*FIG. 3*

Slice-To-Disk Mapping 172

| Slice # | Disk Loc. |
|---|---|
| 0 | D0, $LBA_{0,0}$ (D) |
|  | D1, $LBA_{0,1}$ (D) |
|  | D2, $LBA_{0,2}$ (D) |
|  | D3, $LBA_{0,3}$ (D) |
|  | D4, $LBA_{0,4}$ (P) |
| 1 | D0, $LBA_{1,0}$ (D) |
|  | D1, $LBA_{1,1}$ (D) |
|  | D2, $LBA_{1,2}$ (D) |
|  | D3, $LBA_{0,3}$ (P) |
|  | D4, $LBA_{1,4}$ (D) |

SPARSE RAID REBUILD BASED ON STORAGE EXTENT ALLOCATION

BACKGROUND

Data storage systems are arrangements of hardware and software that include one or more storage processors coupled to arrays of non-volatile storage devices. The storage processors service storage requests, arriving from host machines ("hosts"), which specify files or other data elements to be written, read, created, or deleted, for example. Software running on the storage processors manages incoming storage requests and performs various data processing tasks to organize and secure the data elements stored on the non-volatile storage devices.

Data storage systems may include RAID groups for providing non-volatile storage. RAID is an acronym for Redundant Array of Independent (or "Inexpensive") Disks. Each RAID group typically includes multiple disk drives of a common type (e.g., magnetic disk drives, solid state drives, optical drives, etc.). RAID groups can be arranged in accordance with various schemes, as indicated by RAID number. Certain RAID schemes provide redundant data storage, either in the form of mirroring (e.g., RAID 1) or in the form of parity (e.g., RAID 5 and RAID 6). RAID 5 provides single parity, meaning that a RAID 5 group can suffer the loss of any one disk drive without losing data. RAID 6 provides double parity, meaning that a RAID 6 group can suffer the loss of any two disk drives without losing data.

Data storage systems often include spare disk drives. When a failure occurs in a disk drive of a RAID group, a data storage system may logically replace the failed drive with a spare and proceed to rebuild data onto the spare to match the data previously stored on the failed drive. For example, the data storage system may read the other disk drives in the RAID group, compute repair data for the spare based on the data read from the other drives, and write the computed data to the spare drive. Rebuilding the repair data onto the spare drive has the effect of restoring the RAID group to its original level of redundancy.

SUMMARY

Unfortunately, the prior approach to rebuilding repair data onto spare drives of RAID groups is inefficient. For example, to rebuild repair data onto a spare drive that replaces a failed drive in a RAID group, it is necessary for a data storage system to read corresponding data from other disk drives in the RAID group. Such read operations can involve reading nearly the entire contents of such other disk drives, resulting in high consumption of valuable system resources. Not only do the read operations take considerable time to perform, but also they can displace disk IO induced by host applications, potentially reducing the performance of those host applications. As disk drives continue to increase in capacity, the burdens of rebuilding disk drive data in the event of drive failures are expected to become ever more severe.

In contrast with the prior approach, an improved technique for repairing a RAID (Redundant Array of Independent Disks) group in a data storage system following a failure of a disk drive in the RAID group includes identifying regions of the failed disk drive that supported unallocated storage extents and writing predetermined data to corresponding regions of the spare disk drive. Any reading of other disk drives in the RAID group may thus be limited only to those regions of the failed disk drive that supported (prior to failure) allocated storage extents. As the number of allocated storage extents may be a fraction of the total number of storage extents served by the RAID group, the burden of rebuilding the RAID group following a disk drive failure is significantly reduced.

In an example, the predetermined data is based on known initial data written to unallocated storage extents, such that the initial data directly implies the predetermined data. For instance, if the initial data written to all unallocated storage extents is all zeros, then the predetermined data may in some examples also be all zeros. Where the failed disk drive stored parity information for unallocated storage extents, the predetermined data may be zero in some cases and non-zero in others (e.g., based on the formula used to compute parity). In all cases, the predetermined data is known without having to read other disk drives in the RAID group.

Certain embodiments are directed to a method of repairing a RAID (Redundant Array of Independent Disks) group in a data storage system following a failure of a disk drive in the RAID group. The method includes providing a spare disk drive to replace the disk drive in the RAID group that failed and accessing metadata in the data storage system. The metadata indicates an allocation status of multiple storage extents formed from the RAID group. The storage extents formed from the RAID group include a first set of storage extents that the metadata indicates is not allocated and a second set of storage extents that the metadata indicates is allocated. For each of the first set of storage extents, the method further includes writing predetermined data to the spare disk drive at regions that will support that storage extent. For each of the second set of storage extents, the method further includes (i) reading portions of data from regions that support that storage extent on a set of other disk drives of the RAID group, (ii) provide repair data for that storage extent based on the portions of data read for that storage extent, and (iii) writing the repair data for that storage extent to the spare disk drive. The method thereby avoids any need to read portions of data from other disk drives for storage extents that are not allocated.

Other embodiments are directed to a data storage system constructed and arranged to perform a method, such as that described above. Still other embodiments are directed to a computer program product. The computer program product stores instructions which, when executed on control circuitry of a data storage system, cause the data storage system to perform a method, such as the method described above. Some embodiments involve activity that is performed at a single location, while other embodiments involve activity that is distributed over a computerized environment (e.g., over a network).

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views. In the accompanying drawings.

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

An improved technique for repairing a RAID (Redundant Array of Independent Disks) group in a data storage system following a failure of a disk drive in the RAID group includes identifying regions of the failed disk drive that supported, prior to failure, unallocated storage extents and writing predetermined data to corresponding regions of the spare disk drive. Any reading of other disk drives in the RAID group may thus be limited only to those regions of the failed disk drive that supported allocated storage extents.

Figure 1:
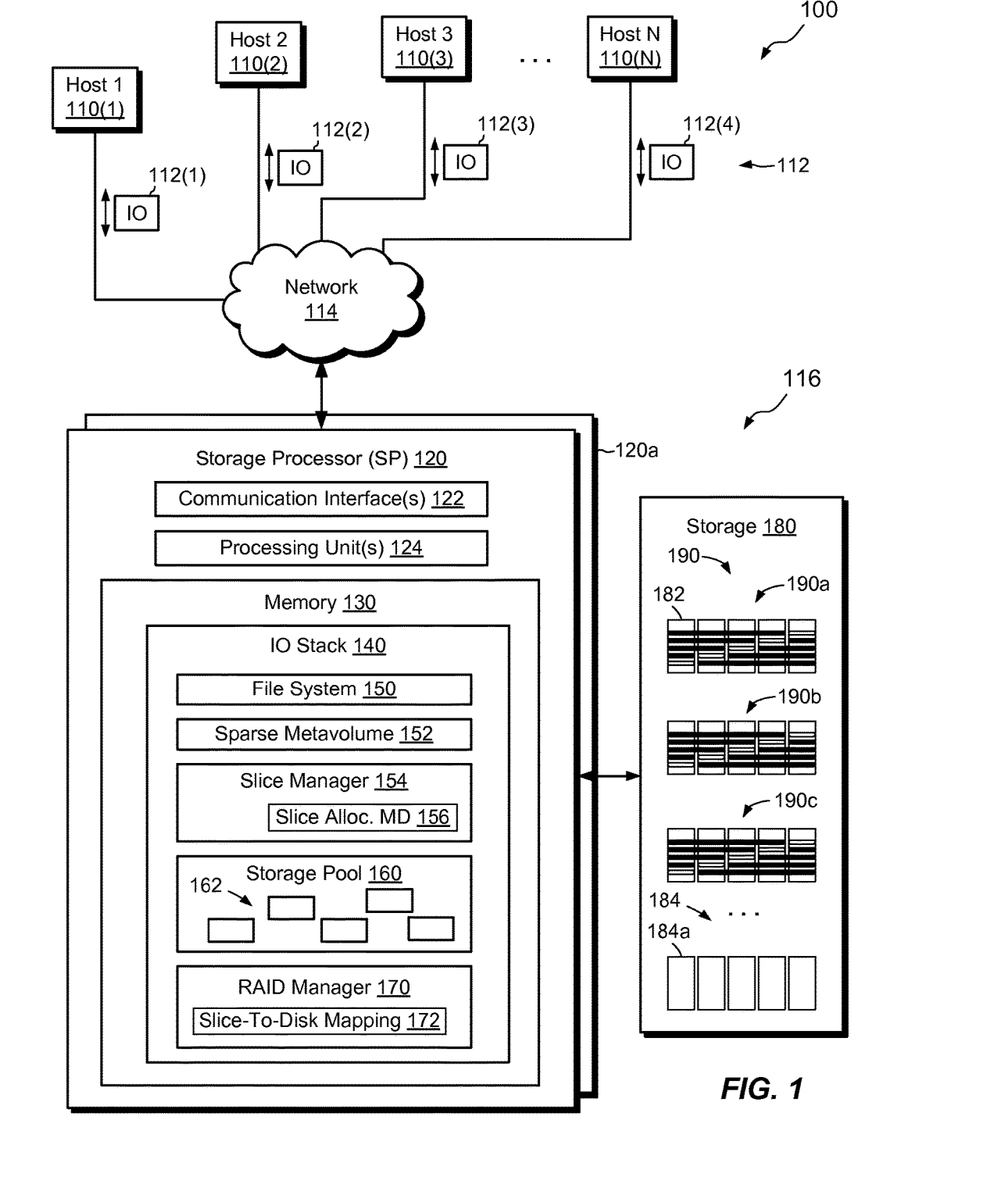
FIG. 1 is a block diagram of an example environment in which embodiments of the invention hereof can be performed.

FIG. 1 shows an example environment 100 in which embodiments of the improved technique hereof can be practiced. Here, multiple host computing devices ("hosts"), shown as devices 110(1) through 110(N), access a data storage system 116 over a network 114. The data storage system 116 includes a storage processor, or "SP," 120 and storage 180. The data storage system 116 may include multiple SPs like the SP 120 (e.g., a second SP, 120a). In an example, multiple SPs may be provided as circuit board assemblies, or "blades," which plug into a chassis that encloses and cools the SPs. The chassis has a backplane for interconnecting the SPs, and additional connections may be made among SPs using cables. It is understood, however, that no particular hardware configuration is required, as any number of SPs, including a single SP, may be provided and the SP 120 can be any type of computing device capable of processing host IOs.

In an example, the storage 180 includes RAID groups 190a, 190b, and 190c (generally, 190), where each RAID group 190 is composed of multiple disk drives. The disk drives in the RAID groups 190 may include magnetic disk drives, electronic flash drives, optical drives, or other types of drives. The storage 180 also includes spare disk drives 184. In a typical example, each of the RAID groups 190 includes disk drives of a common type that provide similar performance. Any number of RAID groups may be provided, including a single RAID group, and the RAID groups may be of any type (e.g., any RAID number or variant thereof). The example shown is intended to be merely illustrative.

The network 114 can be any type of network or combination of networks, such as a storage area network (SAN), a local area network (LAN), a wide area network (WAN), the Internet, and/or some other type of network or combination of networks, for example. The hosts 110(1-N) may connect to the SP 120 using various technologies, such as Fibre Channel, iSCSI, NFS, SMB 3.0, and CIFS, for example. Any number of hosts 110(1-N) may be provided, using any of the above protocols, some subset thereof, or other protocols besides those shown. As is known, Fibre Channel and iSCSI are block-based protocols, whereas NFS, SMB 3.0, and CIFS are file-based protocols. The SP 120 is configured to receive IO requests 112(1-N) according to block-based and/or file-based protocols and to respond to such IO requests 112(1-N) by reading and/or writing the storage 180.

The SP 120 is seen to include one or more communication interfaces 122, a set of processing units 124, and memory 130. The communication interfaces 122 include, for example, SCSI target adapters and network interface adapters for converting electronic and/or optical signals received over the network 114 to electronic form for use by the SP 120. The set of processing units 124 includes one or more processing chips and/or assemblies. In a particular example, the set of processing units 124 includes numerous multi-core CPUs, as well as associated coprocessors and chipsets. The memory 130 includes both volatile memory (e.g., RAM), and non-volatile memory, such as one or more ROMs, disk drives, solid state drives, and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 are caused to carry out the operations of the software constructs. Although certain software constructs are specifically shown and described, it is understood that the memory 130 typically includes many other software constructs, which are not shown, such as an operating system, various applications, processes, and daemons.

As further shown in FIG. 1, the memory 130 includes (i.e., realizes by operation of programming code) an IO stack 140. The IO stack 140 provides an execution path for host IOs (e.g., IO requests 112). The IO stack 140 is seen to include a file system 150, a sparse metavolume 152, a slice manager 154, a storage pool 160, and a RAID manager 170.

In an example, the RAID manager 170 is configured to create, maintain, and repair RAID groups 190. The RAID manager 170 includes mapping (e.g., slice-to-disk mapping 172) for mapping storage extents to particular locations within disk drives of the RAID groups 190.

Storage pool 160 maintains a reservoir of storage extents, such as slices 162. In an example, slices 162 are uniformly-sized storage extents derived from one or more of the RAID groups 190. Each slice 162 is derived from a single RAID group 190. The slices 162 include allocated slices and free slices. Allocated slices are allocated for use in supporting data objects hosted by the data storage system, such as LUNs (Logical Units), file, systems, VVols (Virtual Volumes, available from VMware, Inc. of Palo Alto, Calif.). Free slices are not currently allocated but may be available for allocation as required. In an example, each free slice in the storage pool 160 is initialized with initial data, such as all zeros.

In an example, each slice 162 includes multiple blocks of storage, where a "block" is the smallest unit of addressable storage in the RAID groups 190. A common block size is 8 KB, and a common slice size is 256 MB or 1 GB, for example, although block sizes and slice sizes may vary. If one assumes a block size of 8 KB and a slice size of 256 MB, each slice 162 includes 32 K blocks.

Slice manager 154 manages slices 162 and includes slice allocation metadata 156. The slice allocation metadata 156 identifies slices that are allocated and slices that are free.

Sparse metavolume 152 is an internal volume that supports file system 150 and has a physical address space that may be sparsely populated with slices 162. In an example, slices 162 are provisioned to the sparse metavolume 152 on demand.

File system 150 is built upon the sparse metavolume 152. As will be described, file system 150 is an internal file system that realizes data objects (e.g., LUNs, file systems, VVols, etc.) in the form of container files. Mapping (not shown) between the container files and data objects allows hosts 110(1-N) to access the data objects realized within the container files.

The data storage system 116 may include any number of storage pools, like the storage pool 160. In an example, each storage pool 160 includes slices 162 derived from one or more RAID groups 190, with each RAID group 190 being dedicated to a particular storage pool 160. Each storage pool 160 may support a single file system 150 and an associated sparse metavolume 152, or it may support multiple file systems 150 and respective sparse metavolumes 152. In one example, each file system 150 includes a single container file realizing a single data object. In another example, each file system 150 includes multiple container files realizing multiple data objects. In some arrangements, each file system 150 includes a single container file that realizes a production data object and other container files that realize snaps (point-in-time versions) of the data object.

In example operation, the hosts 110(1-N) issue IO requests 112(1-N) to the data storage system 116. The IO requests 112 specify data to be written to and/or read from specified locations in data objects served by the data storage system 116 (e.g., LUNs, file systems, VVols, etc.). The SP 120 receives the IO requests 112 at the communication interfaces 122 and passes the IO requests 112 to the IO stack 140 for further processing. The IO stack 140 maps the IO requests 112 to respective reads and/or writes at corresponding storage locations in the RAID groups 190.

During the course of operation, a disk drive in one of the RAID groups 190 may fail. For example, disk drive 182 in RAID group 190*a* may become unresponsive to read requests and/or write requests. In response to the failure, the RAID manager 170 detects the failure and provides a spare disk drive 184*a* to be used in place of failed drive 182. It should be understood that a physical, slot-for-slot replacement of disk drive 182 with disk drive 184*a* is not generally required. Rather, the disk drive 184*a* may be a "hot spare," which the data storage system 116 maintains in a powered state and which is already connected to the SP 120. Thus, providing the spare disk drive 184*a* in place of the failing disk drive 182 may be accomplished logically, e.g., by changing configuration data. Eventually, a service technician may swap out the failing disk drive 182 with a new spare, but any such physical change would generally occur later.

In an example, the RAID group 190*a* continues to operate during this disk replacement, with the RAID manager 170 directing reads and writes to other disk drives in the RAID group 190*a* and relying upon data redundancy to cover for the failed disk drive 182. Depending on the level of redundancy, the RAID group 190*a* may be in a vulnerable state, however, as it might be unable to suffer the failure of another disk drive without losing data. Thus, in an example, the RAID manager 170 is configured to proceed quickly in rebuilding the RAID group 190*a* following the failure.

The process of rebuilding the RAID group 190*a* is greatly simplified according to improvements hereof. Rather than having to read the entire contents of the other disk drives of RAID group 190*a*, as would be done in prior repair schemes, reading of other disk drives may be performed here only for regions of the failed drive 182 that stored data for allocated slices. Other regions, which stored data for unallocated slices, may be rebuilt using a much simpler scheme, i.e., by writing predetermined data to those regions in the spare drive 184*a*, i.e., without having to read the other disk drives.

In an example, writing predetermined data to regions on the spare disk drive 184*a* that correspond to unallocated slices is consistent with RAID semantics. For example, if free slices are initialized to all zeros, then the predetermined data may also be set to all zeros. This setting reflects the correct state of the data to be written to unallocated space without having to read other disk drives and without having to perform computations. Writing zeros as the predetermined data usually works even for regions of the spare disk 184*a* that store parity, as parity is often computed as the exclusive-OR (XOR) of data and zero XOR zero is still zero. Although some formulas for computing parity may produce non-zero results when operating on zeroed data, the results of such parity computations are still known in advance and, hence, predetermined. Thus, predetermined data (either of a single value or of multiple values) may be written to all regions of the spare disk 184*a* that correspond to unallocated slices.

Of course, the value (or values) of the predetermined data may depend upon the initial data written to free slices, which may vary. Data other than zero, and even complex patterns, may be used as initial data. Even so, however, predetermined data to be written to the spare drive 184*a* are known in advance, as data regions on the spare drive 184*a* match the initial data and parity regions are readily computable based on the initial data.

Thus, the improvement hereof significantly reduces the workload involved in rebuilding RAID groups following disk drive failures. Indeed, the improvement saves time, processing power, and disk IO roughly in proportion to the ratio of unallocated slices to total slices 162. Through the use of this technique, the data storage system 116 is more likely to maintain desired performance, even when rebuilding RAID groups.

Figure 2:
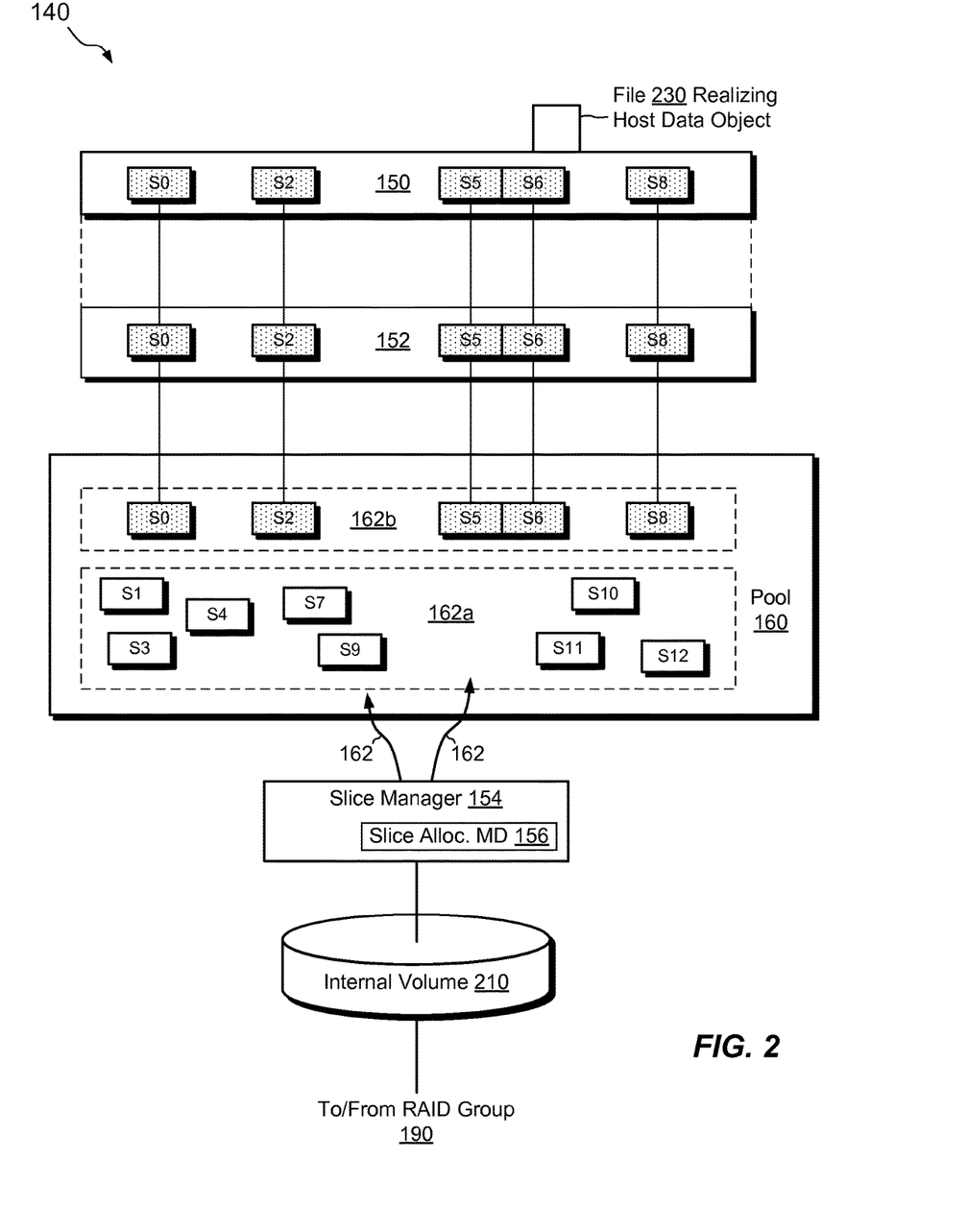
FIG. 2 is a block diagram of portions of an example IO stack of FIG. 1 in additional detail.

FIG. 2 shows example features of the IO stack 140 in greater detail. Here, it is seen that the IO stack 140 expresses a RAID group 190 (FIG. 1) as an internal volume 210. In an example, the IO stack 140 configures the internal volume 210 as a LUN, in which blocks are addressed based on offset ranges. Slice manager 154 logically carves the internal volume 210 into slices 162 and manages slice allocation metadata 156. The slice allocation metadata 156 identifies some slices as free and other slices as allocated. In this particular example, a first set of slices 162*a* includes free (unallocated) slices S1, S3, S4, S7, and S9-S12, and a second set of slices 162*b* includes allocated slices S0, S2, S5, S6, and S8. In the example shown, the allocated slices S0, S2, S5, S6, and S8 have been provisioned to the sparse metavolume 152, which supports the file system 150.

The file system 150 includes a container file 230. The container file realizes a host data object, such as a host-accessible LUN, file system, or VVol, for example. The file system 150 may include other structures (not shown), such as other files and file system metadata. The file system metadata may include inodes, indirect blocks, per-block metadata, and other types of file system metadata. Provisioning slices 162 to the sparse metavolume 152 has the effect of provisioning those slices to the file system 150. Thus, all the data and metadata of the file system 150 are stored within the provisioned slices S0, S2, S5, S6, and S8.

It should be understood that the internal volume 210, storage pool 160, slices 162, sparse metavolume 152, file system 150, and file 230 are logical structures instantiated within the SP 120 and that the actual storage for these structures may be found in the RAID group 190. Further, although some of the slices 162 appear in multiple locations (i.e., in the pool 160, sparse metavolume 152, and file system 150), the multiple appearances of these slices does not indicate duplication but rather the fact that the same slices may be present in each of these logical structures at the same time.

Although FIG. 2 shows a single RAID group 190 and a single internal volume 210 feeding slices 162 into the storage pool 160, it should be understood that the storage pool 160 may receive slices 162 from multiple RAID groups 190 via respective internal volumes 210 (i.e., one for each RAID group). Thus, the storage pool 160 may include slices derived from any number of RAID groups 190.

Figure 3:
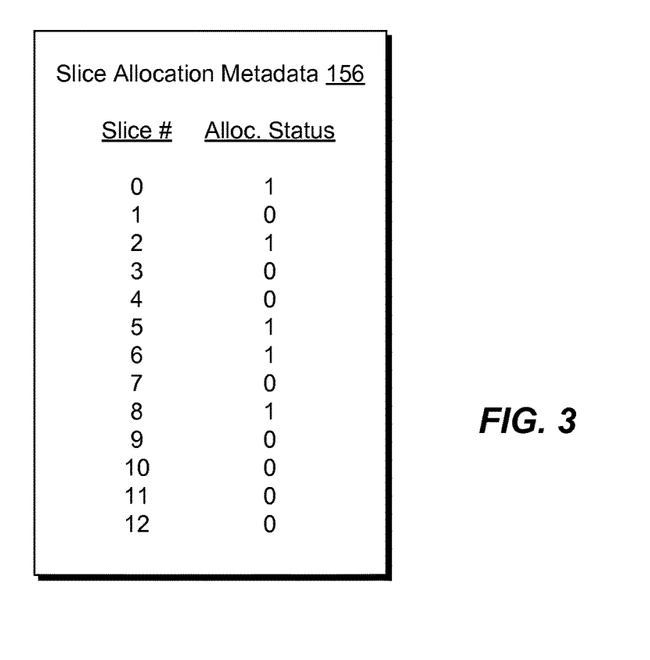
FIG. 3 is a diagram showing example slice allocation metadata of FIG. 1 in additional detail.

FIG. 3 shows example slice allocation metadata 156 in greater detail. Here, the slice allocation metadata 156 indicates an allocation status for each slice 162 shown in FIG. 2, with each slice identified by a slice number. In this example, an allocation status of "1" identifies the respective slice as allocated, while an allocation status of "0" identifies the respective slice as free (unallocated). Thus, and as previously described, slices S0, S2, S5, S6, and S8 are allocated and slices S1, S3, S4, S7, and S9-S12 are free. In an example, the data storage system 116 stores the slice allocation metadata 156 persistently but maintains an in-memory version for fast access.

Figure 4:
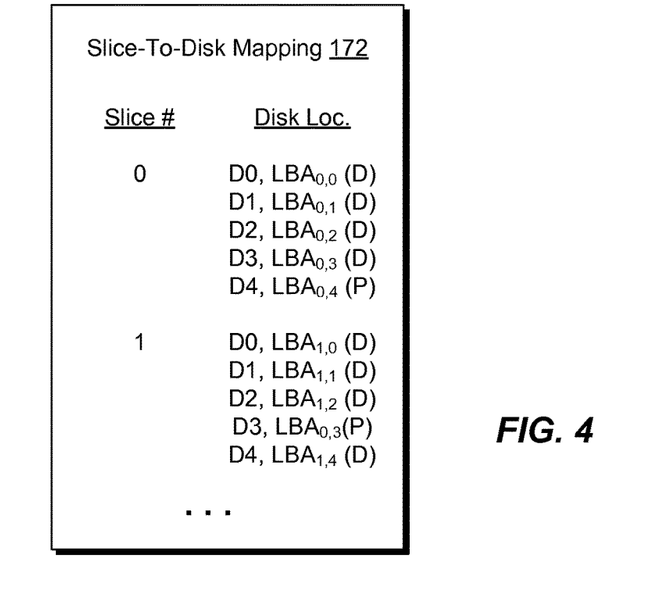
FIG. 4 is a diagram showing example slice-to-disk mapping of FIG. 1 in additional detail.

FIG. 4 shows example slice-to-disk mapping 172 in greater detail. Here, it is seen that slice-to-disk mapping 172 lists multiple disk drive locations for each slice. The disk drive locations indicate regions where data for a respective slice are stored. The disk drive locations may be identified in any suitable way, such by disk drive identifier (e.g., D0, D1, etc.) and logical block address range (LBA) within the identified disk drive. In some examples, the slice-to-disk mapping 172 distinguishes data (D) from parity (P) and identifies which disk locations store data and which store parity. Although the example shown lists five disk drive locations for each slice, this is merely an example. For instance, a single slice may be distributed across hundreds of disk locations. In an example, the data storage system 116 stores the slice-to-disk mapping 172 persistently but maintains an in-memory version for fast access. Although the slice-to-disk mapping 172 is shown as a table, which implies a lookup function for identifying disk locations for a given slice, this is also merely an example. For instance, disk locations for slices may be mapped algorithmically, such that no lookup operations are required.

Figure 5A:
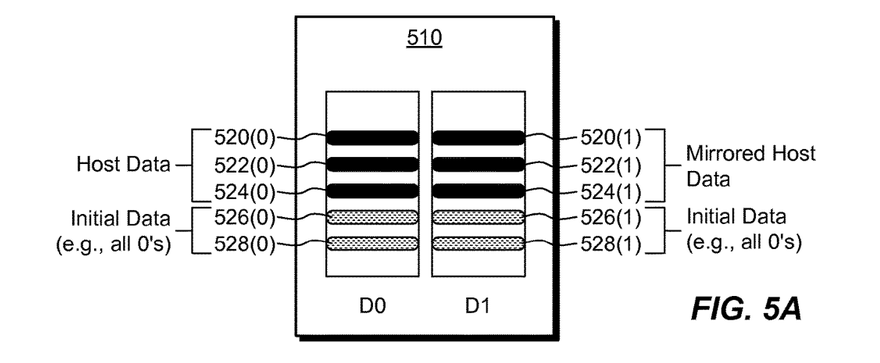
FIGS. 5A-5C are block diagrams showing an example arrangement for repairing a RAID 1 RAID group in accordance with embodiments of the invention hereof.
Figure 5B:
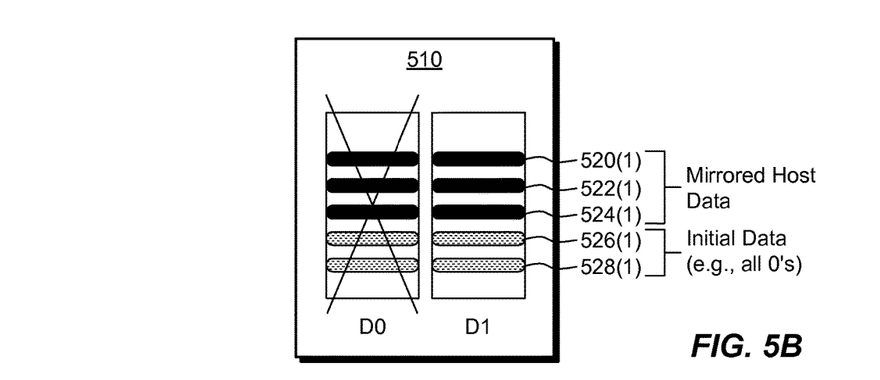
Figure 5C:
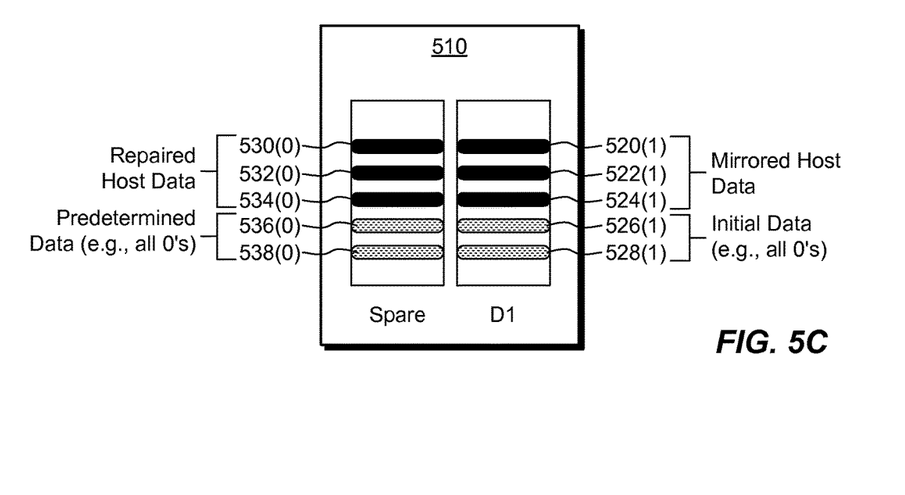

FIGS. 5A-5C show an example arrangement for repairing a RAID group 510 when the RAID group is configured according to RAID 1. As shown in FIG. 5A, a pair of disk drives D0 and D1 are configured as mirrors. Disk elements mapped (e.g., by the slice-to-disk mapping 172) to allocated slices are shown in solid black, while disk elements mapped to free slices are shown in partial shading. Although only five elements per disk are shown, it should be understood any number of elements per disk may be provided.

Here, host data are stored in disk elements 520(0), 522(0), and 524(0) of disk D0 and are mirrored to disk elements 520(1), 522(1), and 524(1), respectively, of disk D1. The host data maps to allocated slices and thus may form parts of one or more host data objects. Initial data (e.g., all zeros or some other initial pattern) are stored in disk elements 526(0) and 528(0) of disk D0 and in disk elements 526(1), and 528(1) of disk D1. The disk elements 526(0), 528(0), 526(1), and 528(1) map to free slices.

At some point, as shown in FIG. 5B, one of the disk drives (e.g., D0) fails. In an example, the RAID manager 170 detects the failure and initiates a process for repairing the RAID group 510.

As shown in FIG. 5C, the repair process includes providing a spare disk drive ("Spare") in place of the failed disk drive (D0) and restoring the data previously stored on D0 onto the spare. In an example, the RAID manager 170 checks the slice allocation metadata 156 and the slice-to-disk mapping 172 for disk D0, identifies disk elements that supported (i.e., stored just prior to failure of D0) allocated slices, and identifies disk elements that supported free slices. Here, the RAID manager 170 determines that disk elements 520(0), 522(0), and 522(0) supported allocated slices and that disk elements 526(0) and 528(0) supported free slices. The RAID manager 170 then proceeds to read elements 520(1), 522(1), and 524(1) of disk D1, which elements store mirrored host data for allocated slices, and to write the mirrored host data to elements 530(0), 532(0), and 534(0) of the spare, i.e., to the disk elements that correspond to elements 520(0), 522(0), and 524(0). However, the RAID manager 170 does not read the other disk elements 526(1) and 528(1) of Disk D1. Rather, the RAID manager 170 merely writes predetermined data to corresponding locations 536(0) and 538(0) of the spare. The predetermined data matches the initial data, to which the unallocated slices where initialized. Thus, in this example, the spare disk can be rebuilt by reading only 60% of disk D1, a potential savings of 40% as compared with conventional schemes.

Figure 6A:
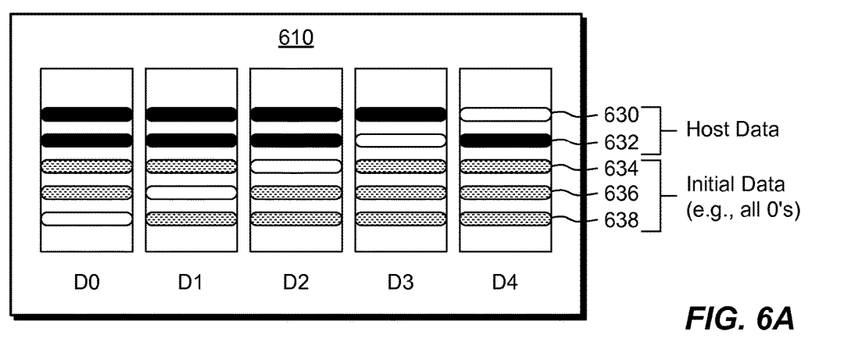
FIGS. 6A-6C are block diagrams showing an example arrangement for repairing a RAID 5 RAID group in accordance with embodiments of the invention hereof.
Figure 6B:
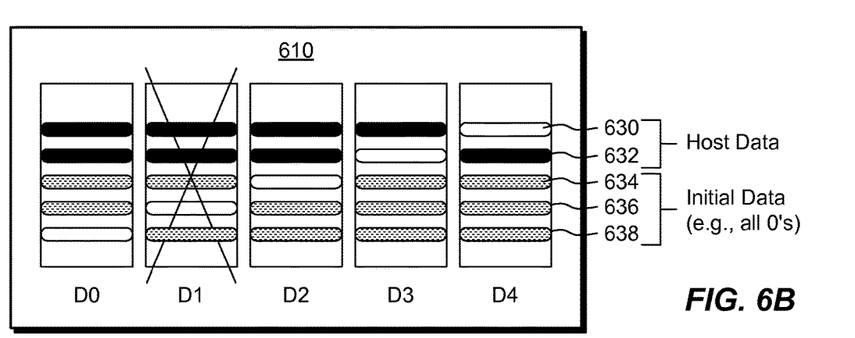
Figure 6C:
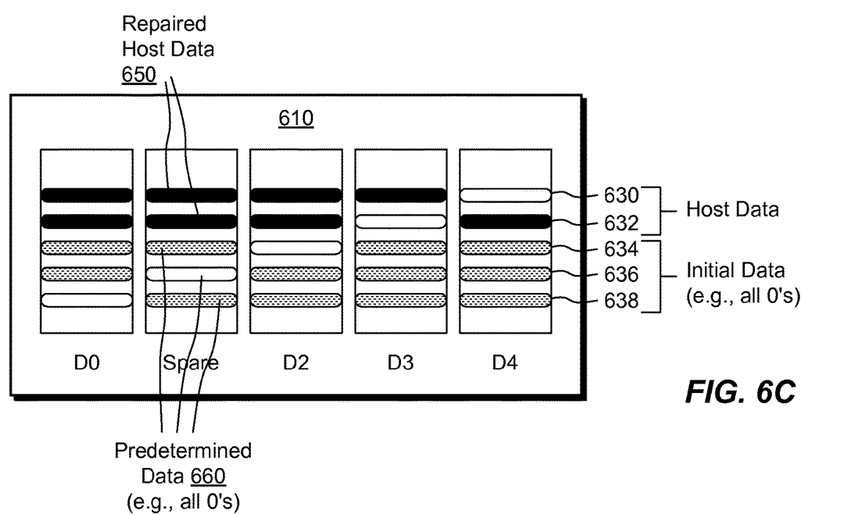

FIGS. 6A-6C show an example arrangement for repairing a RAID group 610 when the RAID group is configured according to RAID 5. As shown in FIG. 6A, five disk drives D0 through D4 are configured as a RAID 5 group with single, rotating parity. As before, disk elements mapped to allocated slices are shown in solid black, while disk elements mapped to free slices are shown in partial shading. Disk elements storing parity information are unshaded. In the example shown, each row of data elements cuts across the five disk drives to form a stripe. Each "stripe" contains four elements storing data and one element storing parity. In an example, the element storing parity is computed as the bitwise XOR of the elements storing data, such that any damaged element (data or parity) can be recovered by taking the bitwise XOR of the four remaining elements in the stripe.

Although five stripes are shown, it should be understood that RAID group 610 may include any number of stripes. A typical size for each disk element is 64 KB, with each stripe therefore storing 256 KB of data, plus parity. Element sizes, and therefore stripe sizes, may vary, however. In an example, the size of slices 162 is aligned with the size of stripes, such that each slice 162 contains an integer number of stripes and such that no stripe extends across multiple slices.

In the example shown, host data and associated parity are stored in stripes 630 and 632. The host data maps to allocated slices and may form parts of one or more host data objects. Initial data (e.g., all zeros or some other initial pattern) are stored in stripes 634, 636, and 638. The stripes 634, 636, and 638 map to free slices. If the initial data is all zeros, the parity is also all zeros, as zero XOR zero equals zero.

At some point, as shown in FIG. 6B, one of the disk drives (e.g., disk D1) fails. In an example, the RAID manager 170 detects the failure and initiates a process for repairing the RAID group 610.

As shown in FIG. 6C, the repair process includes providing a spare disk drive ("Spare") in place of the failed disk drive (D1) and restoring the data previously stored on D1 onto the spare. In an example, the RAID manager 170 checks the slice allocation metadata 156 and the slice-to-disk mapping 172 for disk D1, identifies disk elements that supported (i.e., stored just prior to failure of D1) allocated slices, and identifies disk elements that supported free slices. Here, the RAID manager 170 determines that disk elements in stripes 630 and 632 of D1 supported allocated slices and that disk elements in stripes 634, 636, and 638 of D1 supported free slices. The RAID manager 170 then proceeds to read elements of stripes 630 and 632 from disks D0, D2, D3, and D4, compute repair data 650 as their XOR, and write the computed repair data 650 to elements in stripes 630 and 632 of the spare. However, the RAID manager 170 does not read the disk elements for stripes 634, 636, or 638. Rather, the RAID manager 170 merely writes predetermined data 660 to disk elements of stripes 634, 636, and 638 of the spare. The predetermined data 660 matches the initial data, to which the unallocated slices where initialized. This example reflects a 60% savings in repair activity.

It should be noted that some RAID 5 schemes may use a formula other than a simple XOR to compute parity. In these examples, the predetermined data 660 may be different for parity than it is for data. However, the parity will still be predetermined, as the parity is based only on the initial data and the formula used, which are both known.

Figure 7A:
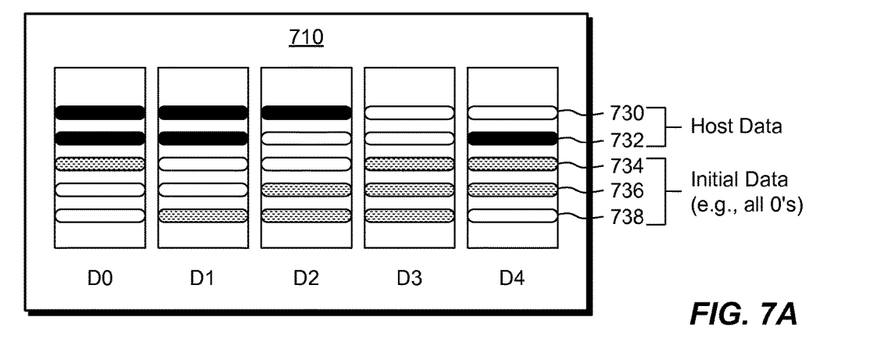
FIGS. 7A-7C are block diagrams showing an example arrangement for repairing a RAID 6 RAID group in accordance with embodiments of the invention hereof.
Figure 7B:
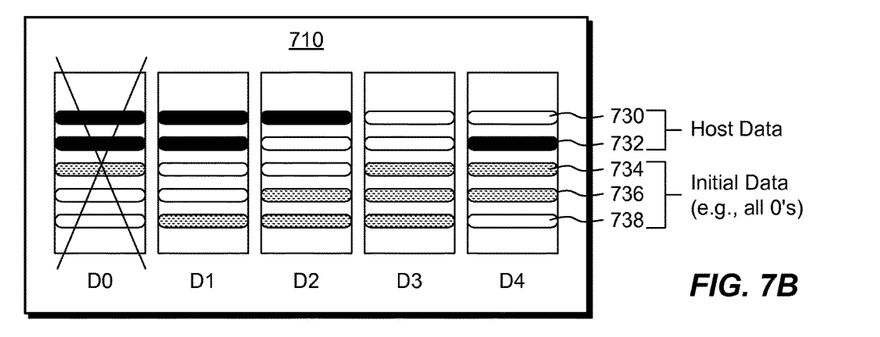
Figure 7C:
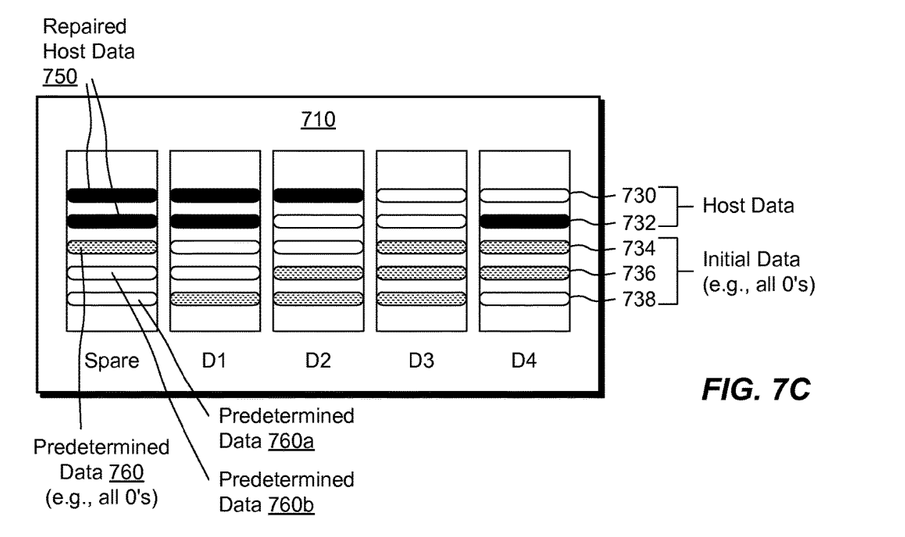

FIGS. 7A-7C show an example arrangement for repairing a RAID group 710 when the RAID group is configured according to RAID 6. As shown in FIG. 7A, five disk drives D0 through D4 are configured as a RAID 6 group with double, rotating parity. As before, disk elements mapped to allocated slices are shown in solid black, disk elements mapped to free slices are shown in partial shading, and disk elements storing parity information are unshaded.

In the example shown, each row of data elements cuts across the five disk drives to form a stripe. Each stripe contains three elements storing data and two elements storing parity. In an example, a first parity element is computed as the bitwise XOR of the elements storing data, while a second parity element is computed using a different method. Although five stripes are shown, it should be understood that RAID group 610 may include any number of stripes, with details of stripe size and element size in this arrangement being similar to those described in connection with the RAID 5 arrangement above.

In the example shown, host data and associated parity are stored in stripes 730 and 732. The host data maps to allocated slices and may form parts of one or more host data objects. Initial data (e.g., all zeros or some other initial pattern) are stored in stripes 734, 736, and 738. The stripes 734, 736, and 738 map to free slices. If the initial data is all zeros, the first parity is also all zeros but the second parity may be non-zero.

At some point, as shown in FIG. 7B, one of the disk drives (e.g., disk D0) fails. In an example, the RAID manager 170 detects the failure and initiates a process for repairing the RAID group 710.

As shown in FIG. 7C, the repair process includes providing a spare disk drive ("Spare") in place of the failed disk drive (D0) and restoring the data previously stored on D0 onto the spare. In an example, the RAID manager 170 checks the slice allocation metadata 156 and the slice-to-disk mapping 172 for disk D0, identifies disk elements that supported (i.e., stored just prior to failure of D0) allocated slices, and identifies disk elements that supported free slices. Here, the RAID manager 170 determines that disk elements in stripes 730 and 732 of D0 supported allocated slices and that disk elements in stripes 734, 736, and 738 of D0 supported free slices. The RAID manager 170 then proceeds to read elements of stripes 730 and 732 from disks D1, D2, D3, and D4, compute repair data 750, and write the computed repair data 750 to disk elements in stripes 730 and 732 of the spare. However, the RAID manager 170 does not read the disk elements on disks D1, D2, D3, and D4 for stripes 734, 736, or 738. Rather, the RAID manager 170 merely writes predetermined data to disk elements of stripes 734, 736, and 738 of the spare. Predetermined data 760 and 760a are provided for data and first parity and thus match the initial data, to which the unallocated slices where initialized. However, predetermined data 760b is provided for second parity and may be different. This example also reflects a 60% savings in repair activity.

Figure 8:
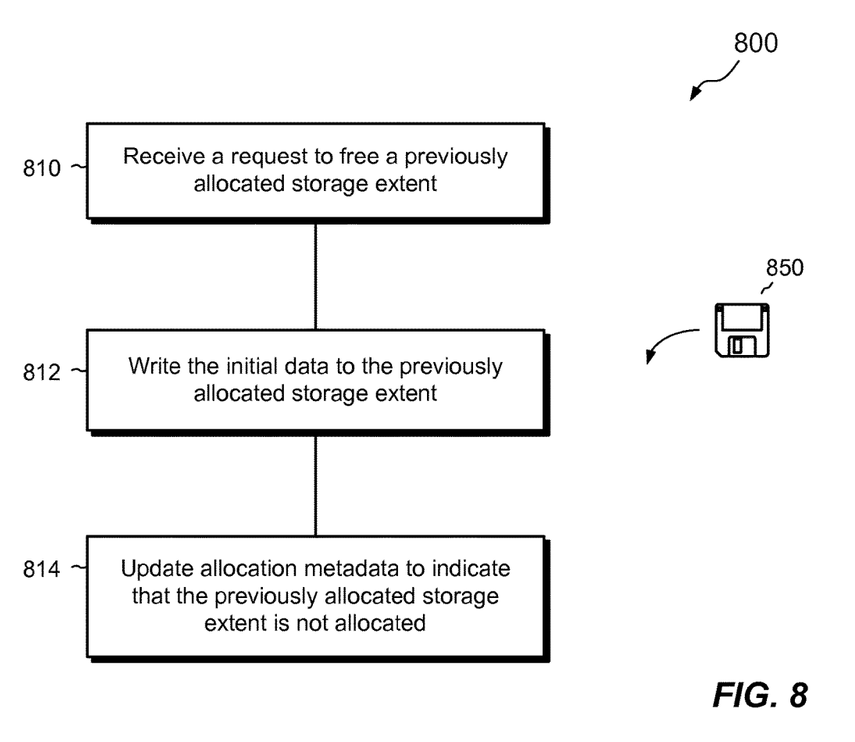
FIG. 8 is a flowchart showing an example method for freeing a previously allocated storage extent.
Figure 9:
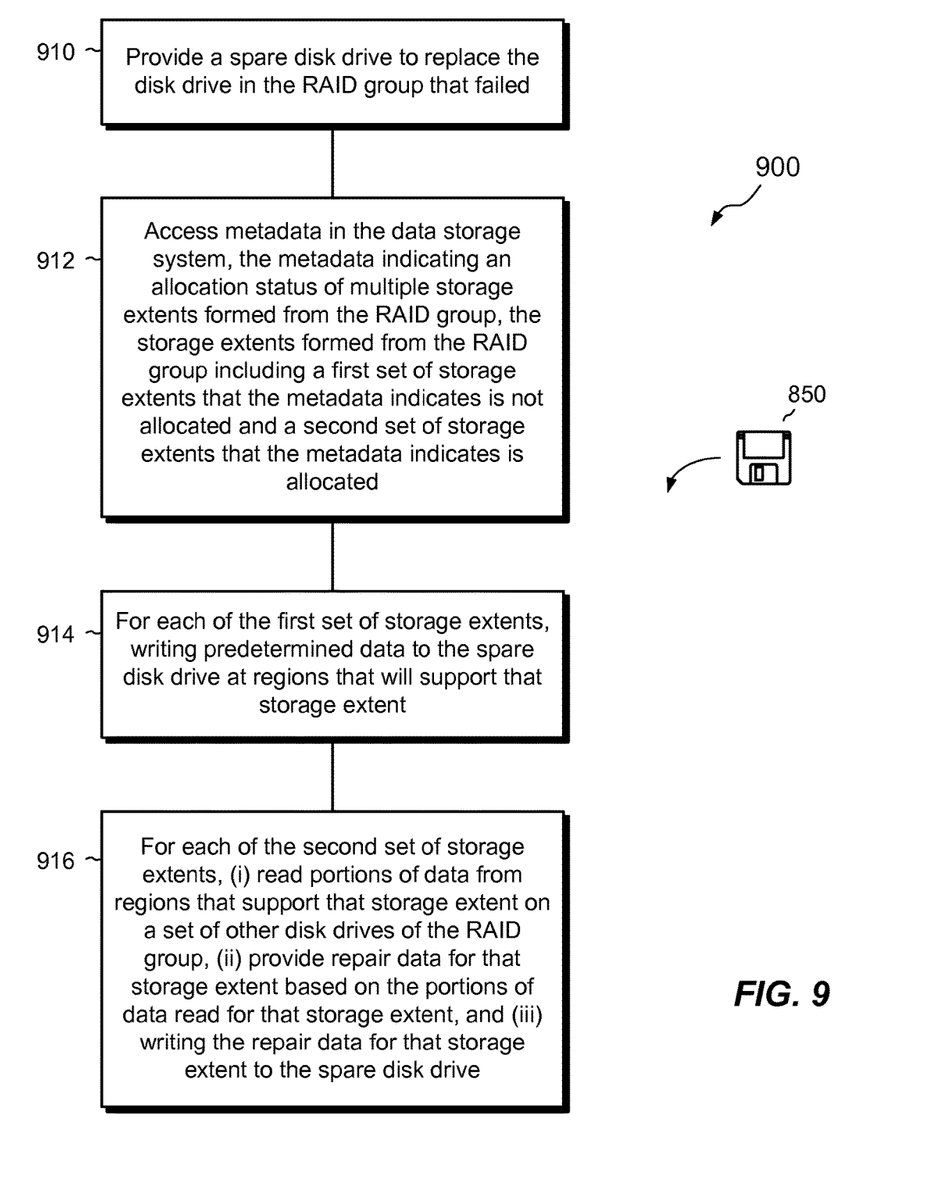
FIG. 9 is a flowchart showing an example method of repairing a RAID group in a data storage system following a failure of a disk drive in the RAID group.

FIGS. 8 and 9 illustrate processes 800 and 900 that may be carried out in connection with the data storage system 116. These processes are typically performed by the software constructs, described in connection with FIGS. 1 and 2, which reside in the memory 130 of the storage processor 120 and are run by the set of processing units 124. The various acts of each process may be ordered in any suitable way. Accordingly, embodiments may be constructed in which acts are performed in orders different from those illustrated, which may include performing some acts simultaneously, even though the acts are shown as sequential in the illustrated embodiments.

FIG. 8 shows an example process 800 for freeing a storage extent, such as a slice 162. At 810, a request is received to free a previously allocated storage extent. For example, the slice manager 154 receives a request from the file system 150 to free a slice 162. The slice 162 may become free as a result of deleted files, truncations, scavenging operations, and the like, for example. At 812, initial data is written to the previously allocated storage extent. For example, the slice 162 may be written with all zeros or some other initial pattern of data. At 814, allocation metadata is updated to indicate that the previously allocated storage extent is not allocated. For example, the slice manager 154 updates the slice allocation metadata 156 (FIG. 3) to change the allocation status of the slice 162 from allocated (e.g., "1") to free (e.g., "0"). With the slice freed and its contents set to the initial data, the slice assumes a state that is consistent with the use of predetermined data when rebuilding RAID groups.

FIG. 9 shows an example process 900 for repairing a RAID group in a data storage system following a failure of a disk drive in the RAID group.

At 910, a spare disk drive is provided to replace the disk drive in the RAID group that failed. For example, as described in connection with FIG. 1, a hot spare 184a may be logically added to a RAID group 190. Alternatively, a spare disk drive may be physically added to the data storage system 116, or a cold (unpowered) disk drive may be brought online and added to the RAID group 190.

At 912, metadata is accessed in the data storage system. The metadata indicates an allocation status of multiple storage extents formed from the RAID group. The storage extents formed from the RAID group include a first set of storage extents that the metadata indicates is not allocated and a second set of storage extents that the metadata indicates is allocated. For example, the RAID manager 170 coordinates with the slice manager 154 to access slice allocation metadata 156, which tracks allocation of slices 162 formed from the RAID group 190. The slice allocation metadata 156 indicates a first set of slices 162a that are free and a second set of slices 162b that are allocated. In an example, the slices 162 are formed from the RAID group 190 by expressing the RAID group 190 as an internal volume 210 and by carving the internal volume 210 into slices 162.

At 914, for each of the first set of storage extents, predetermined data are written to the spare disk drive at regions that will support that storage extent. For example, the RAID manager 170 writes all zeros, or some other predetermined data, to data elements of the spare disk drive that support an unallocated slice. Where the RAID group supports parity, predetermined data may be written to data elements for both data and parity, and the predetermined data written for parity may be different from the predetermined data written for data.

At 914, for each of the second set of storage extents, (i) portions of data are read from regions that support that storage extent on a set of other disk drives of the RAID group, (ii) repair data are provided for that storage extent based on the portions of data read for that storage extent, and (iii) the repair data for that storage extent are written to the spare disk drive. For example, data for allocated slices 162 may be rebuilt in the customary way, by reading corresponding disk elements from other drives, providing repair data, e.g., as the same data read (RAID 1) or using a formula, such as XOR, to recover the data on the failed element from the corresponding elements on the other drives (RAID 5 and RAID 6).

The process 900 therefore avoids any need to read portions of data from other disk drives where such portions of data support storage extents that are not allocated.

An improved technique has been described for repairing a RAID (Redundant Array of Independent Disks) group in a data storage system following a failure of a disk drive in the RAID group. The technique includes identifying regions of the failed disk drive that supported unallocated storage extents and writing predetermined data to corresponding regions of the spare disk drive. Any reading of other disk drives in the RAID group may thus be limited only to those regions of the failed disk drive that supported allocated storage extents. As the number of allocated storage extents may be a fraction of the total number of storage extents served by the RAID group, the burden of rebuilding the RAID group following a disk drive failure is significantly reduced.

Having described certain embodiments, numerous alternative embodiments or variations can be made. For example, as described above, a decision as to whether portions of a RAID group are rebuilt by writing predetermined data or by reading other drives is based on slice allocation. However, this is merely an example, as the decision may alternatively be based on the allocation status of storage extents besides slices. Indeed, storage extents of any granularity may be used, provided the data storage system 116 tracks allocation status of those storage extents. Examples of other suitable types of storage extents include stripes, disk elements, and even blocks.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a computer program product including one or more non-transient, computer-readable storage media, such as a magnetic disk, magnetic tape, compact disk, DVD, optical disk, flash drive, SD (Secure Digital) chip or device, Application Specific Integrated Circuit (ASIC), Field Programmable Gate Array (FPGA), and/or the like (shown by way of example as medium 850 in FIGS. 8 and 9). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a second event may take place before or after a first event, or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A method of repairing a RAID (Redundant Array of Independent Disks) group in a data storage system following a failure of a disk drive in the RAID group, the method comprising:

providing a spare disk drive to replace the disk drive in the RAID group that failed;

accessing metadata in the data storage system, the metadata indicating an allocation status of multiple storage extents formed from the RAID group, the storage extents formed from the RAID group including a first set of storage extents that the metadata indicates is not allocated and a second set of storage extents that the metadata indicates is allocated;

for each of the first set of storage extents, writing predetermined data to the spare disk drive at regions that will support that storage extent; and for each of the second set of storage extents, (i) reading portions of data from regions that support that storage extent on a set of other disk drives of the RAID group, (ii) providing repair data for that storage extent based on the portions of data read for that storage extent, and (iii) writing the repair data for that storage extent to the spare disk drive, the method thereby avoiding any need to read portions of data from other disk drives for storage extents that are not allocated.

2. The method of claim 1, wherein the storage extents are uniformly-sized extents each configured to store multiple blocks of data, wherein the second set of storage extents have been allocated by the data storage system for providing storage space for one or more data objects hosted by the data storage system.

3. The method of claim 2, wherein each of the first set of storage extents stores initial data, and wherein the predetermined data, written to the spare disk, is based on the initial data.

4. The method of claim 3, wherein the RAID group is arranged in a RAID 1 configuration, and wherein the predetermined data written for each of the first set of storage extents is the same as the initial data.

5. The method of claim 3, wherein the initial data is all zeros, wherein each of the first set of storage extents includes an integer number of stripes, each stripe having multiple data elements and a parity element, and wherein the predetermined data written for each of the first set of storage extents is all zeros for each of the data elements in each stripe and is all zeros for the parity element in each stripe.

6. The method of claim 3, wherein the initial data is all zeros, wherein each of the first set of storage extents includes an integer number of stripes, each stripe having multiple data elements, a first parity element, and a second parity element, and wherein the predetermined data written for each of the first set of storage extents is all zeros for each of the data elements in each stripe, is a second predetermined value for each first parity element in each stripe, and is a third predetermined value for each second parity element in each stripe.

7. The method of claim 3, further comprising mapping, by the data storage system, the storage extents to respective disk drive locations where data of the storage extents are stored.

8. The method of claim 7, further comprising:

receiving a request to free a previously allocated storage extent; and in response to receiving the request, (i) writing the initial data to the previously allocated storage extent and (ii) updating the metadata to indicate that the previously allocated storage extent is not allocated.

9. The method of claim 8, wherein, when writing the predetermined data to the spare disk drive for each of the first set of storage extents, the method further comprises executing a single write instruction to write the predetermined data across multiple ones of the first set of storage extents.

10. A data storage system comprising control circuitry that includes a set of processing units coupled to memory, the control circuitry constructed and arranged to:

provide a spare disk drive to replace the disk drive in the RAID group that failed;

access metadata in the data storage system, the metadata indicating an allocation status of multiple storage extents formed from the RAID group, the storage extents formed from the RAID group including a first set of storage extents that the metadata indicates is not allocated and a second set of storage extents that the metadata indicates is allocated; and for each of the first set of storage extents, write predetermined data to the spare disk drive at regions that will support that storage extent;

for each of the second set of storage extents, (i) read portions of data from regions that support that storage extent on a set of other disk drives of the RAID group, (ii) provide repair data for that storage extent based on the portions of data read for that storage extent, and (iii) write the repair data for that storage extent to the spare disk drive.

11. The data storage system of claim 10, wherein the storage extents are uniformly-sized extents each configured to store multiple blocks of data, wherein the second set of storage extents have been allocated by the data storage system for providing storage space for one or more data objects hosted by the data storage system.

12. A computer program product including a set of non-transitory, computer-readable media having instructions which, when executed by control circuitry of a data storage system, cause the control circuitry to perform a method for repairing a RAID (Redundant Array of Independent Disks) group in a data storage system following a failure of a disk drive in the RAID group, the method comprising:

providing a spare disk drive to replace the disk drive in the RAID group that failed;

accessing metadata in the data storage system, the metadata indicating an allocation status of multiple storage extents formed from the RAID group, the storage extents formed from the RAID group including a first set of storage extents that the metadata indicates is not allocated and a second set of storage extents that the metadata indicates is allocated;

for each of the first set of storage extents, writing predetermined data to the spare disk drive at regions that will support that storage extent; and for each of the second set of storage extents, (i) reading portions of data from regions that support that storage extent on a set of other disk drives of the RAID group, (ii) providing repair data for that storage extent based on the portions of data read for that storage extent, and (iii) writing the repair data for that storage extent to the spare disk drive, the method thereby avoiding any need to read portions of data from other disk drives for storage extents that are not allocated.

13. The computer program product of claim 12, wherein the storage extents are uniformly-sized extents each configured to store multiple blocks of data, wherein the second set of storage extents have been allocated by the data storage system for providing storage space for one or more data objects hosted by the data storage system.

14. The computer program product of claim 13, wherein each of the first set of storage extents stores initial data, and wherein the predetermined data, written to the spare disk, is based on the initial data.

15. The computer program product of claim 14, wherein the RAID group is arranged in a RAID 1 configuration, and wherein the predetermined data written for each of the first set of storage extents is the same as the initial data.

16. The computer program product of claim 14,
wherein the initial data is all zeros,
wherein each of the first set of storage extents includes an integer number of stripes, each stripe having multiple data elements and a parity element, and
wherein the predetermined data written for each of the first set of storage extents is all zeros for each of the data elements in each stripe and is all zeros for the parity element in each stripe.

17. The computer program product of claim 14,
wherein the initial data is all zeros,
wherein each of the first set of storage extents includes an integer number of stripes, each stripe having multiple data elements, a first parity element, and a second parity element, and
wherein the predetermined data written for each of the first set of storage extents is all zeros for each of the data elements in each stripe, is a second predetermined value for each first parity element in each stripe, and is a third predetermined value for each second parity element in each stripe.

18. The computer program product of claim 14, wherein the method further comprises mapping, by the data storage system, the storage extents to respective disk drive locations where data of the storage extents are stored.

19. The computer program product of claim 18, wherein the method further comprises:
  receiving a request to free a previously allocated storage extent; and
  in response to receiving the request, (i) writing the initial data to the previously allocated storage extent and (ii) updating the metadata to indicate that the previously allocated storage extent is not allocated.

20. The computer program product of claim 19, wherein, when writing the predetermined data to the spare disk drive for each of the first set of storage extents, the method further comprises executing a single write instruction to write the predetermined data across multiple ones of the first set of storage extents.

21. The method of claim 1, wherein the predetermined data is established prior to the failure of the disk drive.

* * * * *